United States Patent
Katayama et al.

(10) Patent No.: US 7,266,444 B2
(45) Date of Patent: Sep. 4, 2007

(54) DRIVER LOAD MEASURING METHOD, DEVICE, AND PROGRAM FOR A VEHICLE ACCOMPANIED BY ATTITUDE CHANGES, AND STORAGE MEDIUM FOR STORING THE PROGRAM

(75) Inventors: Mutsumi Katayama, Saitama (JP); Yutaka Kamata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 11/228,392

(22) Filed: Sep. 19, 2005

(65) Prior Publication Data
US 2006/0069498 A1    Mar. 30, 2006

(30) Foreign Application Priority Data
Sep. 30, 2004    (JP) ............................. 2004-287570

(51) Int. Cl.
*G06G 7/48* (2006.01)
*G06F 17/10* (2006.01)
(52) U.S. Cl. .................... 701/124; 701/41; 73/271; 73/290; 73/218
(58) Field of Classification Search ............... 701/124, 701/41; 180/271, 290, 218; 280/263, 281.1; 73/65.01
See application file for complete search history.

(56) References Cited

U.S. PATENT DOCUMENTS

| | | | | |
|---|---|---|---|---|
| 4,218,672 A | * | 8/1980 | Weisshappel et al. | 340/440 |
| 4,691,792 A | * | 9/1987 | Shintani | 177/1 |
| 4,812,806 A | * | 3/1989 | Freeman | 340/440 |
| 5,251,968 A | * | 10/1993 | Rath | 303/9.62 |
| 5,732,377 A | * | 3/1998 | Eckert | 701/83 |
| 6,067,340 A | * | 5/2000 | Eppstein et al. | 378/4 |
| 6,377,906 B1 | * | 4/2002 | Rowe | 702/151 |

(Continued)

FOREIGN PATENT DOCUMENTS

| | | | |
|---|---|---|---|
| JP | 11-227491 A | | 8/1999 |
| JP | 11227491 A | * | 8/1999 |

*Primary Examiner*—Thomas Black
*Assistant Examiner*—Jorge O. Peche
(74) *Attorney, Agent, or Firm*—Birch, Stewart, Kolasch & Birch, LLP (57) ABSTRACT

A driver load measuring method, device, and program, and a storage medium for storing the program for accurately measuring a load on a driver driving a vehicle accompanied by attitude changes. The driver load measuring device includes a yaw rate detecting section for detecting a yaw rate y as an example of the angular velocity of a vehicle accompanied by attitude changes, a storing section for storing the results of detection of the yaw rate y, a predicting section for predicting an n-th yaw rate according to an actual [n-1]-th yaw rate y[n-1], an actual [n-2]-th yaw rate y[n-2], and an actual [n-3]-th yaw rate y[n-3] each detected previously, an error calculating section for calculating an error between a predicted result yp[n] of the n-th yaw rate and an actual n-th yaw rate y[n], a frequency distribution recording section for recording a frequency distribution of the errors e in a predetermined time period, and a cell setting section for obtaining a percentile (% tile) value α according to the above frequency distribution and setting a plurality of ranges (cells) discrete from this % tile value α at a predetermined rate.

11 Claims, 11 Drawing Sheets

U.S. PATENT DOCUMENTS

| | | | |
|---|---|---|---|
| 6,389,883 B1* | 5/2002 | Berme et al. | 73/65.01 |
| 6,529,809 B1* | 3/2003 | Breed et al. | 701/45 |
| 6,564,142 B2* | 5/2003 | Godwin et al. | 701/124 |
| 6,712,170 B2* | 3/2004 | Panizzolo | 180/283 |
| 6,829,524 B2* | 12/2004 | Chee | 701/1 |
| 6,859,713 B2* | 2/2005 | Pallot | 701/72 |
| 6,876,300 B2* | 4/2005 | Ponziani | 340/476 |
| 2002/0099497 A1* | 7/2002 | Godwin et al. | 701/124 |
| 2003/0000757 A1* | 1/2003 | Ishida et al. | 180/271 |
| 2003/0093206 A1* | 5/2003 | Pallot | 701/70 |
| 2003/0093207 A1* | 5/2003 | Pallot | 701/70 |
| 2005/0283296 A1* | 12/2005 | Viaud | 701/50 |
| 2006/0149447 A1* | 7/2006 | Williston et al. | 701/41 |
| 2006/0273657 A1* | 12/2006 | Wanke et al. | 303/146 |
| 2007/0078593 A1* | 4/2007 | Fiedler et al. | 701/124 |

* cited by examiner

| CELL CLASS | CELL RANGE |
|---|---|
| FIRST CELL | $e \leq -5\alpha$ |
| SECOND CELL | $-5\alpha < e \leq -2.5\alpha$ |
| THIRD CELL | $-2.5\alpha < e \leq -\alpha$ |
| FOURTH CELL | $-\alpha < e \leq -0.5\alpha$ |
| FIFTH CELL | $-0.5\alpha < e \leq 0.5\alpha$ |
| SIXTH CELL | $0.5\alpha < e \leq \alpha$ |
| SEVENTH CELL | $\alpha < e \leq 2.5\alpha$ |
| EIGHTH CELL | $2.5\alpha < e \leq 5\alpha$ |
| NINTH CELL | $5\alpha < e$ |

| CELL CLASS | CELL RANGE |
|---|---|
| FIRST CELL | $e \leq -5\alpha$ |
| SECOND CELL | $-5\alpha < e \leq -3.5\alpha$ |
| THIRD CELL | $-3.5\alpha < e \leq -2\alpha$ |
| FOURTH CELL | $-2\alpha < e \leq$ |
| FIFTH CELL | |
| SIXTH CELL | |
| SEVENTH CELL | |
| EIGHTH CELL | |
| NINTH CELL | |
| TENTH CELL | |

FIG.7

| LOAD | UNLOAD | CALCULATION | GROUPING |

| DRIVING DATA | YAW RATE ENTROPHY (Hp) | RECALCULATED ENTROPHY | RELATIVE ENTROPHY |
|---|---|---|---|
| a001 | 0.72 | | |
| b001 | 0.68 | | |
| c003 | 0.6 | | |
| a002 | 0.74 | | |
| ⋮ | ⋮ | | |

FIG.8

| LOAD | UNLOAD | CALCULATION | GROUPING |

| DRIVING DATA | YAW RATE ENTROPHY (Hp) | RECALCULATED ENTROPHY | RELATIVE ENTROPHY |
|---|---|---|---|
| c003 | 0.6 | 0.6 | 0 |
| b001 | 0.68 | 0.71 | 0.11 |
| a002 | 0.74 | 0.77 | 0.17 |
| a001 | 0.72 | 0.79 | 0.19 |
| ⋮ | ⋮ | ⋮ | ⋮ |

FIG.9

| DRIVING DATA | YAW RATE ENTROPHY (Hp) | RECALCULATED ENTROPHY | RELATIVE ENTROPHY |
|---|---|---|---|
| c003 | 0.6 | 0.6 | 0 |
| b001 | 0.68 | 0.71 | 0.11 |
| a002 | 0.74 | 0.78 | 0.18 |
| a001 | 0.72 | | |
| ⋮ | ⋮ | ⋮ | ⋮ |

Buttons: LOAD | UNLOAD | CALCULATION | GROUPING

DRIVER LOAD MEASURING METHOD, DEVICE, AND PROGRAM FOR A VEHICLE ACCOMPANIED BY ATTITUDE CHANGES, AND STORAGE MEDIUM FOR STORING THE PROGRAM

CROSS-REFERENCE TO RELATED APPLICATION

The present application claims priority under 35 U.S.C. §119 to Japanese Patent Application No. 2004-287570, filed Sep. 30, 2004, the entire contents of which are hereby incorporated by reference.

BACKGROUND OF THE INVENTION

1. Field of the Invention

The present invention relates to a driver load measuring method, device, and program for measuring a load on a driver, and a storage medium for storing the program, and more particularly to a driver load measuring method, device, and program for quantitatively measuring a load on a driver driving a vehicle accompanied by attitude changes, and a storage medium for storing the program.

2. Description of Background Art

As a device for quantitatively measuring a load on a driver, techniques for measuring a load on a driver driving a four-wheeled vehicle by a steering entropy method are disclosed in Japanese Patent Laid-open No. 11-227491 and in Proceedings Nos. 45-99, pp. 5-8, Development of "Steering Entropy Method", of a corporate juridical party, Science Lecture Meeting.

The steering entropy method is a method of measuring a driver load according to the smoothness of a steering operation (steering angle) as an input from the driver to the vehicle. If the driver attention is distracted by the load, the time of no steering operation becomes longer than that under no load on the driver, so that a large steering angle error is stored and a corrective steering amount to be corrected upon restoring the driver attention becomes large. Thus, smoothness is lost from time-series data of the steering angle. As a result, variations in steering angle error become large to cause an increase in entropy.

In the steering entropy method disclosed in Japanese Patent Laid-open No. 11-227491, attention is focused on the fact that the smoothness of steering operation changes according to the presence/absence or magnitude of a load on a driver. Further, steering angles in a four-wheeled vehicle under the load on the driver are detected as time-series data, and this time-series data is compared with time-series data under no load on the driver to obtain an error therebetween. This error is statistically analyzed to thereby obtain the load.

The course control in a four-wheeled vehicle of the vehicles accompanied by attitude changes depends substantially on only a steering angle. Therefore, the driver load can be detected as a change in steering angle. However, the course control in another type of vehicle, such as a motorcycle, is performed not only by a steering operation, but also by the shift of a passenger's weight or a throttle operation. Accordingly, in a motorcycle or the like, the driver load cannot be detected by the detection of a steering angle as in the prior art.

SUMMARY AND OBJECTS OF THE INVENTION

It is accordingly an object of the present invention to provide a driver load measuring method, device, and program, and a storage medium for storing the program which can accurately measure a load on a driver driving a vehicle accompanied by attitude changes.

According to the present invention, there a driver load measuring device is provided for measuring a load on a driver driving a vehicle accompanied by attitude changes, said driver load measuring device comprising angular velocity detecting means for periodically detecting an angular velocity of said vehicle driven by said driver to which said load is applied; angular velocity predicting means for predicting a value for said angular velocity at an n-th timing from values for said angular velocity at the previous timings before said n-th timing, according to time-series data of said angular velocity detected above; means for obtaining an error between said predicted value and said detected value for said angular velocity at said n-th timing; and load calculating means for calculating said load according to a distribution of said errors in a predetermined time period.

The following effects can be attained by the present invention.

(1) Behavior changes of the vehicle under the load on the driver that are not smooth are detected as changes in angular velocity, so that the load on the driver driving the vehicle can be calculated accurately and quantitatively.

(2) Behavior changes of the vehicle are detected as changes in angular velocity, so that the load on the driver driving the vehicle can be detected by a simple and inexpensive configuration.

(3) Data obtained by making the load different can be simply compared.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
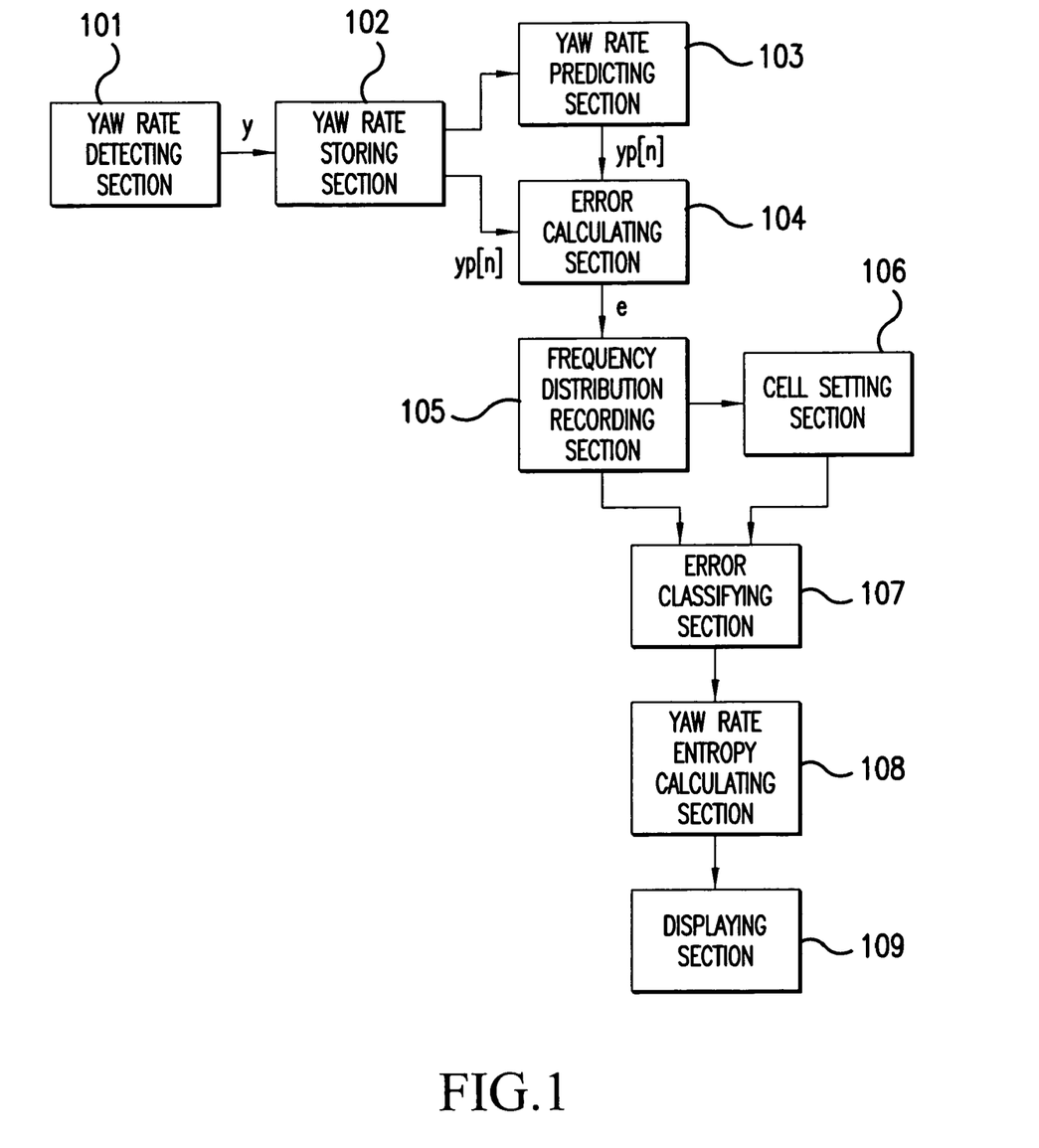
FIG. 1 is a block diagram showing the configuration of a main part of the driver load measuring device according to the present invention.

FIG. 1 is a block diagram showing the configuration of a main part of the driver load measuring device according to the present invention, which main part includes a yaw rate detecting section 101 for periodically detecting a yaw rate y as an example of the angular velocity of a vehicle accompanied by attitude changes, a yaw rate storing section 102 for storing the results of detection of the yaw rate y as time-series data, a yaw rate predicting section 103 for predicting a yaw rate to be detected at an n-th sampling period (which yaw rate will be hereinafter referred to as n-th yaw rate) according to an actual [n-1]-th yaw rate y[n-1], an actual [n-2]-th yaw rate y[n-2], and an actual [n-3]-th yaw rate y[n-3] each detected previously, an error calculating section 104 for calculating an error e between a predicted result yp[n] of the n-th yaw rate and an actual n-th yaw rate y[n], a frequency distribution recording section 105 for recording a frequency distribution of many errors e obtained by changing the value n, a cell setting section 106 for obtaining a percentile (% tile) value (e.g., 90% tile value in this preferred embodiment) α according to the above frequency distribution and setting a plurality of ranges (cells) discrete from this % tile value α at a predetermined rate, an error classifying section 107 for classifying all the errors e into the plural cells, a yaw rate entropy calculating section 108 for calculating a yaw rate entropy according to the results of classification of the errors e, and a displaying section 109 for displaying the results of calculation of the yaw rate entropy.

Figure 2:
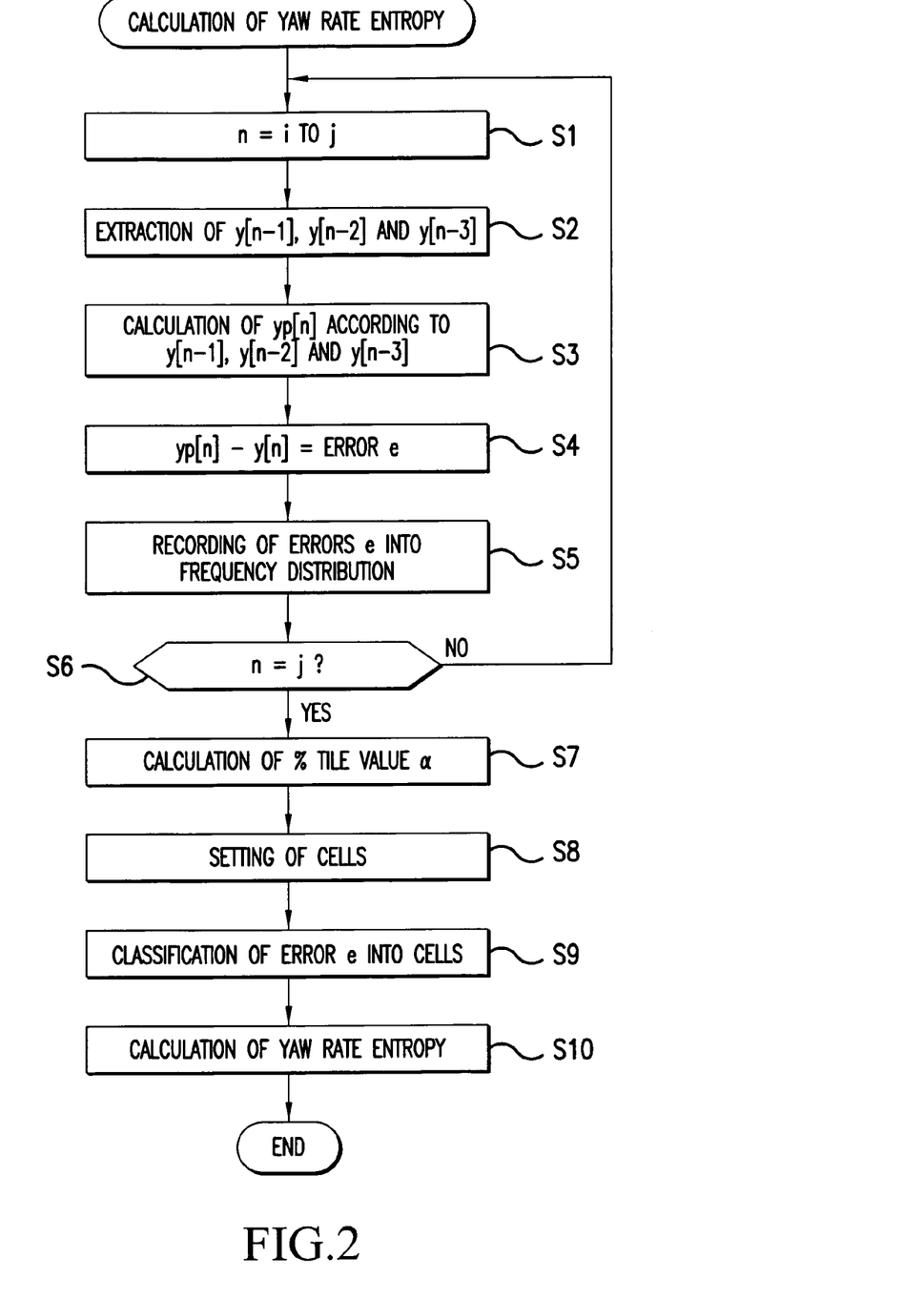
FIG. 2 is a flowchart showing the processing of calculating a yaw rate entropy.

FIG. 2 is a flowchart showing a program for calculating the yaw rate entropy, wherein it is assumed that a driving simulation has already been performed under the condition where a predetermined load is given and that the results of detection of the yaw rate y have already been stored as time-series data in the yaw rate storing section 102.

In step S1, a start point "i" and an end point "j" of sampling timing are suitably set as an evaluation range, and the start point "i" is set to the present marked timing n. In step S2, the [n-1]-th yaw rate y[n-1], the [n-2]-th yaw rate y[n-2], and the [n3]-th yaw rate y[n3] are extracted from the yaw rate storing section 102 by the yaw rate predicting section 103 as the yaw rates at the past three consecutive sampling timings, so as to predict the n-th yaw rate. In step S3, the predicted value yp[n] of the n-th yaw rate is calculated according to the above three consecutive yaw rates y[n-1], y[n-2], and y[n-3] from Equation (1) by the Taylor expansion of the second order with the timing [n-1] centered.

$$y_p[n]=y[n-1]+(y[n-1]y[n-2])+1/2\{(y[n-1]-y[n-2])-(y[n-2]-y[n-3])\}$$ Equation (1)

In step S4, the measured value of the n-th yaw rate y[n] is extracted from the yaw rate storing section 102, and the error e between this measured value y[n] and the predicted value yp[n] is calculated. In step S5, this error e is recorded into the frequency distribution. In step S6, it is determined whether or not the marked timing n has reached the end point "j" of the evaluation object. If the answer in step S6 is No, the marked timing n is incremented to repeat the steps S1 to S5 until the marked timing n reaches the end point "j", thereby recording the error e of the yaw rate at each timing into the frequency distribution.

Figure 3:
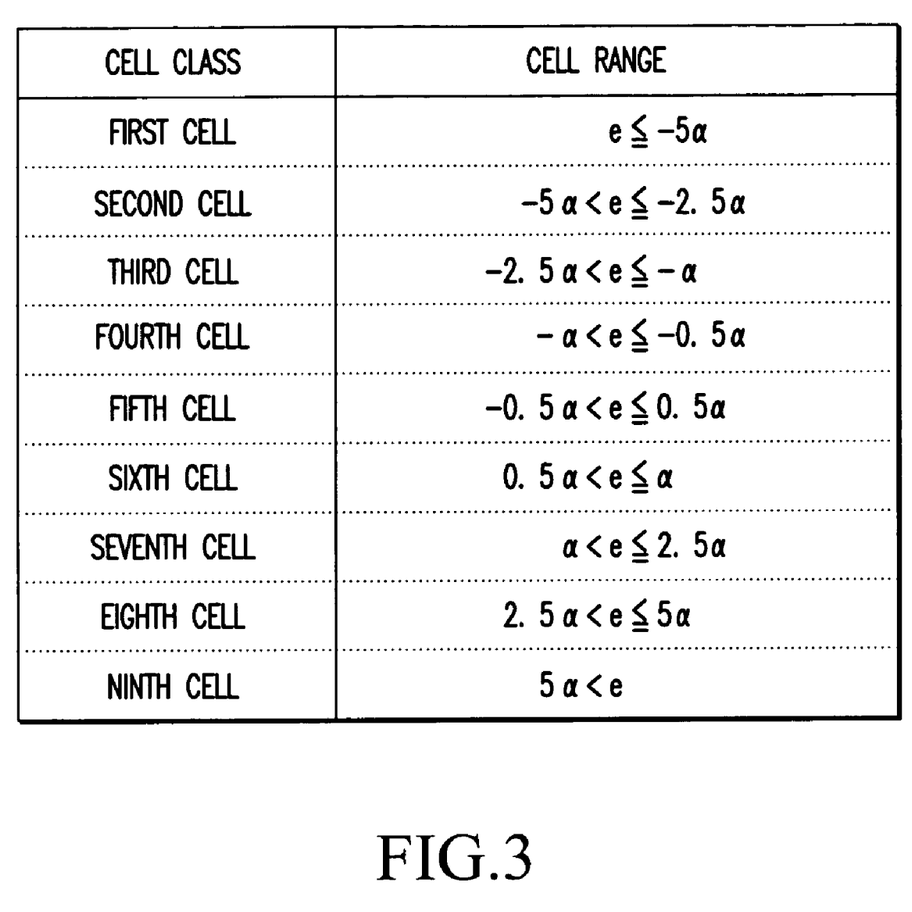
FIG. 3 is a table showing an example of the setting of cells.
Figure 4:
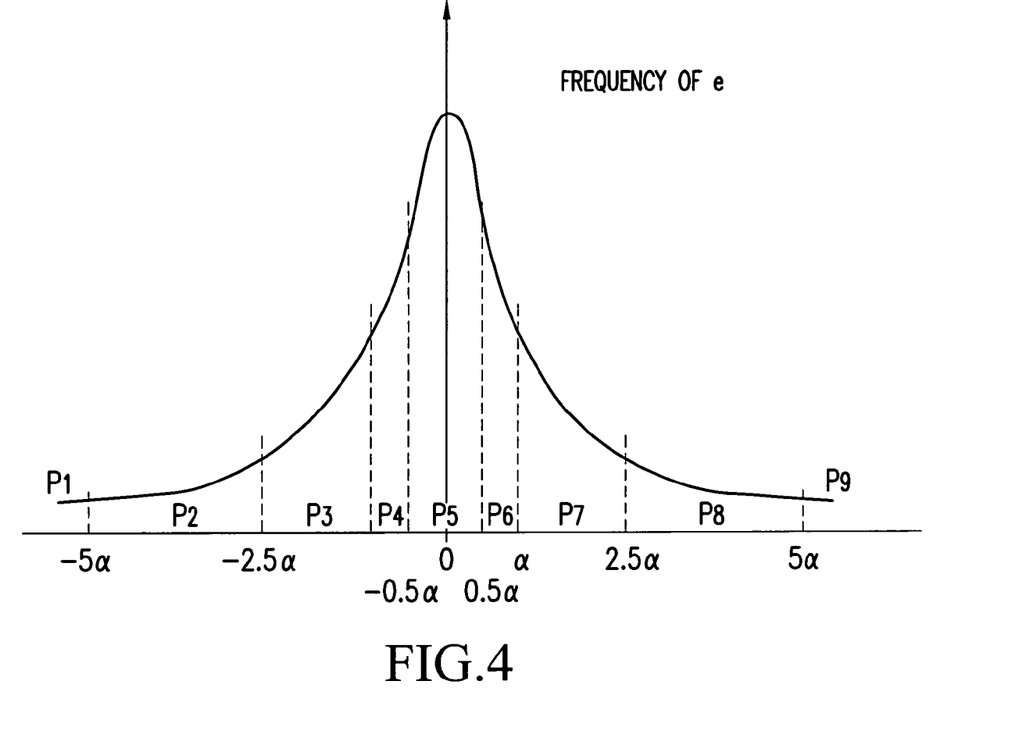
FIG. 4 is a graph showing an example of the classification of errors into the cells.

After completing the recording of the errors e into the frequency distribution in the evaluation object range, the program proceeds to step S7 to calculate the 90% tile value α according to the frequency distribution of the errors e. In step S8, nine cells (first to ninth cells), for example, are set according to this 90% tile value a as shown in FIG. 3. In step S9, all the errors e are classified into the nine cells, and the probabilities P1 to P9 of classification of the errors e into the first to ninth cells are obtained as shown in FIG. 4. In step S110, the yaw rate entropy Hp in the case of nine cells is calculated from Equation (2).

$$H_P = -\sum_{k=1}^{9} P_k \log_9 P_k$$ Equation (2)

There will now be described a preferred embodiment of a driving simulator to which the driver load measuring device mentioned above is applied.

Figure 5:
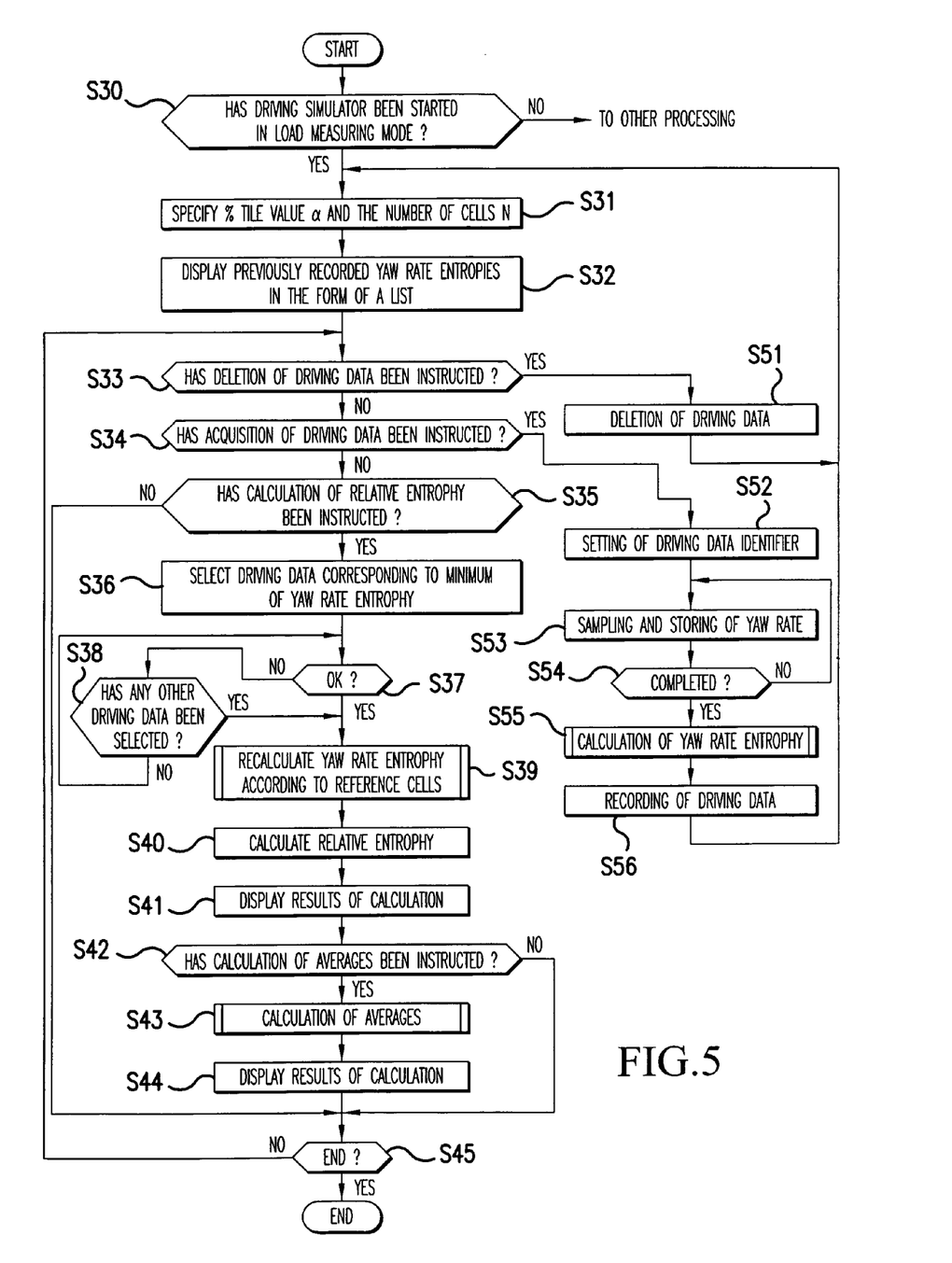
FIG. 5 is a flowchart showing the operation of a preferred embodiment of a driving simulator.
Figure 6:
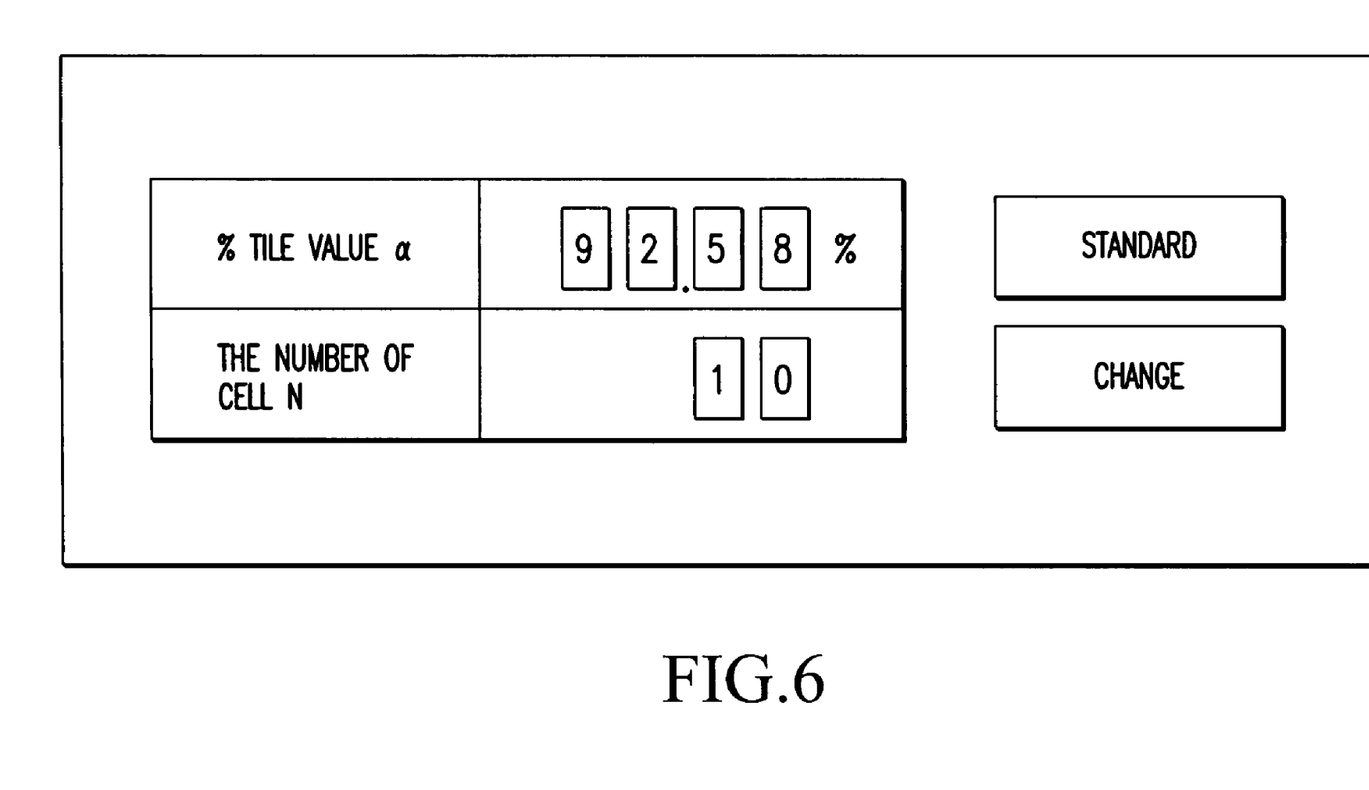
FIG. 6 is an illustration showing an example of an input screen for specifying a percentile (% tile) value α and the number of cells N.

FIG. 5 is a flowchart showing the operation of this preferred embodiment. When it is detected that the driving simulator has been started in a load measuring mode in step S30, an input screen for specifying the percentile (% tile) value α and the number of cells N to be hereinafter described is displayed. FIG. 6 shows an example of the input screen for the % tile value α and the number of cells N, wherein when a "Standard" button on the input screen is clicked, "90" and "9" are recorded as default values for the % tile value α and the number of cells N, respectively, for example. In the case that an operator desires to record any values other than the above default values, desired values are input and a "Change" button on the input screen is then clicked. In the case that no operation is performed on the input screen for a predetermined time period, the above default values are automatically recorded.

Figure 7:
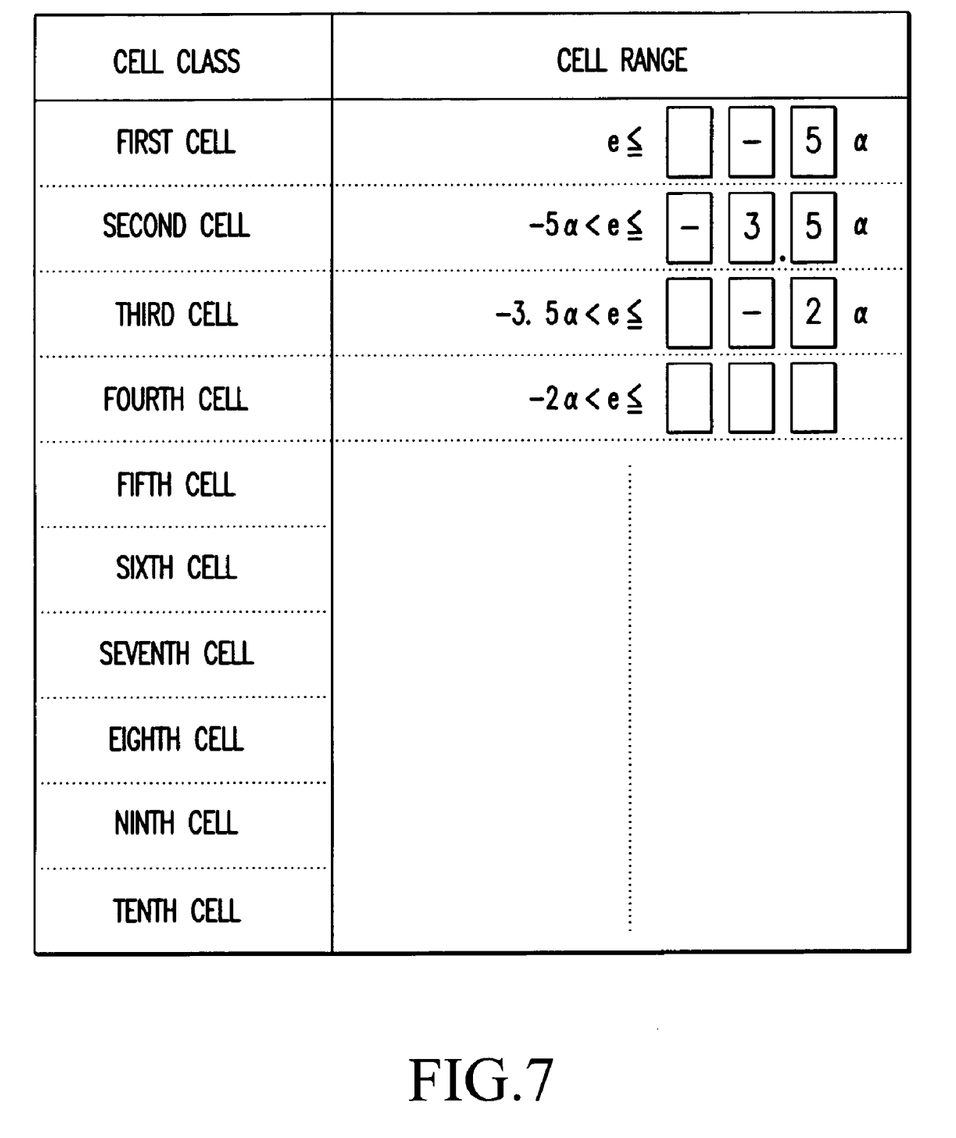
FIG. 7 is an illustration showing an example of a cell range setting screen.

After completing the recording of the % tile value α and the number of cells N, a cell range setting screen is displayed as shown in FIG. 7 for illustration. When the operator inputs an upper limit in each cell range (on the right side of each cell range in FIG. 7), a lower limit in each cell range (on the left side of each cell range in FIG. 7) is automatically set according to the upper limit input above.

Figure 8:
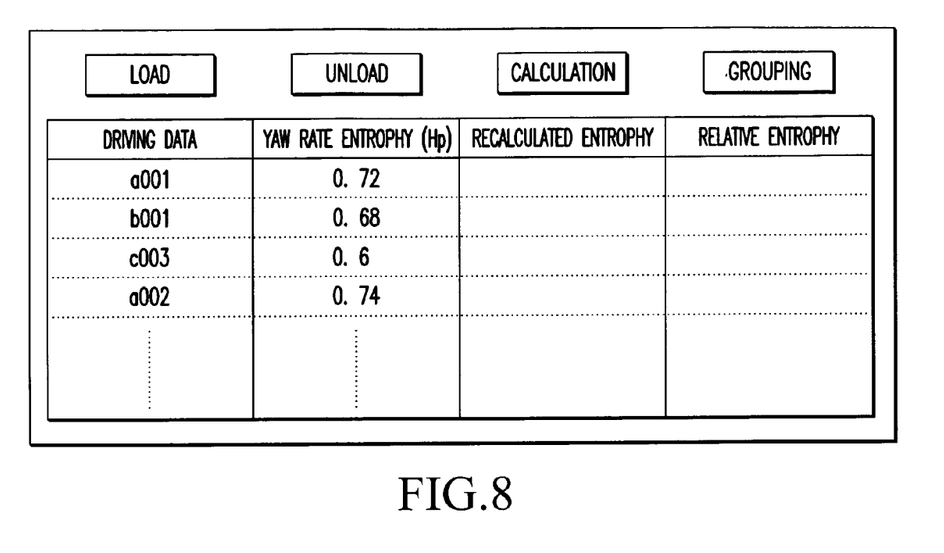
FIG. 8 is an illustration showing an example of the display of the yaw rate entropy.

In step S32, previously calculated and stored values of the yaw rate entropy Hp respectively corresponding to the recorded pieces of driving data are displayed in the form of a list. FIG. 8 shows an example of such a display of the yaw rate entropy Hp, wherein the results of calculation of the yaw rate entropy Hp are displayed in the form of a list so as to respectively correspond to identifiers [a001], [b001], [c003], and [a002] of the driving data. If the % tile value α and the number of cells N are different among the recorded pieces of the driving data, the % tile value α and the number of cells N are recorded again on the input screen in step S31 to recalculate the yaw rate entropy Hp.

In step S33, it is determined whether or not the deletion of any recorded piece of the driving data has been instructed. For example, when the operator specifies any recorded piece of the driving data on the screen shown in FIG. 8 and then clicks an "Unload" button shown in FIG. 8, the program proceeds to step S51 to delete the above-specified piece of the driving data and information on the corresponding yaw rate entropy. In step S34, it is determined whether or not the acquisition of a new piece of driving data has been instructed. For example, when the operator clicks a "Load" button on the screen shown in FIG. 8, it is determined that the acquisition of a new piece of driving data has been instructed, and the program then proceeds to step S52.

In step S52, an identifier for the above new piece of driving data is set. In step S53, the acquisition of the new piece of driving data is started to apply a predetermined load to the driver and to periodically sample the yaw rate y by the yaw rate detecting section 101. The results of this sampling are managed by the above identifier and stored into the yaw rate storing section 102. When the acquisition of the new piece of driving data is completed in step S54, the processing of calculating the yaw rate entropy described with reference to the flowchart of FIG. 2 is executed in step S55 to calculate the yaw rate entropy Hp. In step S56, the new piece of driving data and the corresponding yaw rate entropy Hp are recorded.

If the acquisition of any new piece of driving data is not instructed in step S34, the program proceeds to step S35 to determine whether or not the calculation of a relative entropy has been instructed by the operator. When a "Calculation" button on the screen shown in FIG. 8 is clicked by the operator, it is determined that the calculation of the relative entropy has been instructed, and the program proceeds to step S36. In step S36, the specific piece of driving data corresponding to the minimum value of the yaw rate entropy, e.g., the specific piece of driving data identified by the identifier [c003] corresponding to the minimum value "0.6" of the yaw rate entropy in the example shown in FIG. 8, is automatically selected as reference driving data. Further, the display of this driving data is inverted and a confirmation message is displayed.

When the operator affirmatively answers to this confirmation message, the specific piece of driving data identified by the identifier [c003] is determined as the reference driving data. In contrast, when the operator clicks any other piece of driving data on the screen shown in FIG. 8, so as to change the reference driving data, this operation is detected in step S38 and the reference driving data is changed. In step S39, reference cells are set according to the error e of the yaw rate y corresponding to the reference driving data selected above, and the yaw rate entropy corresponding to the other piece of driving data selected above is recalculated according to the reference cells.

Figure 11:
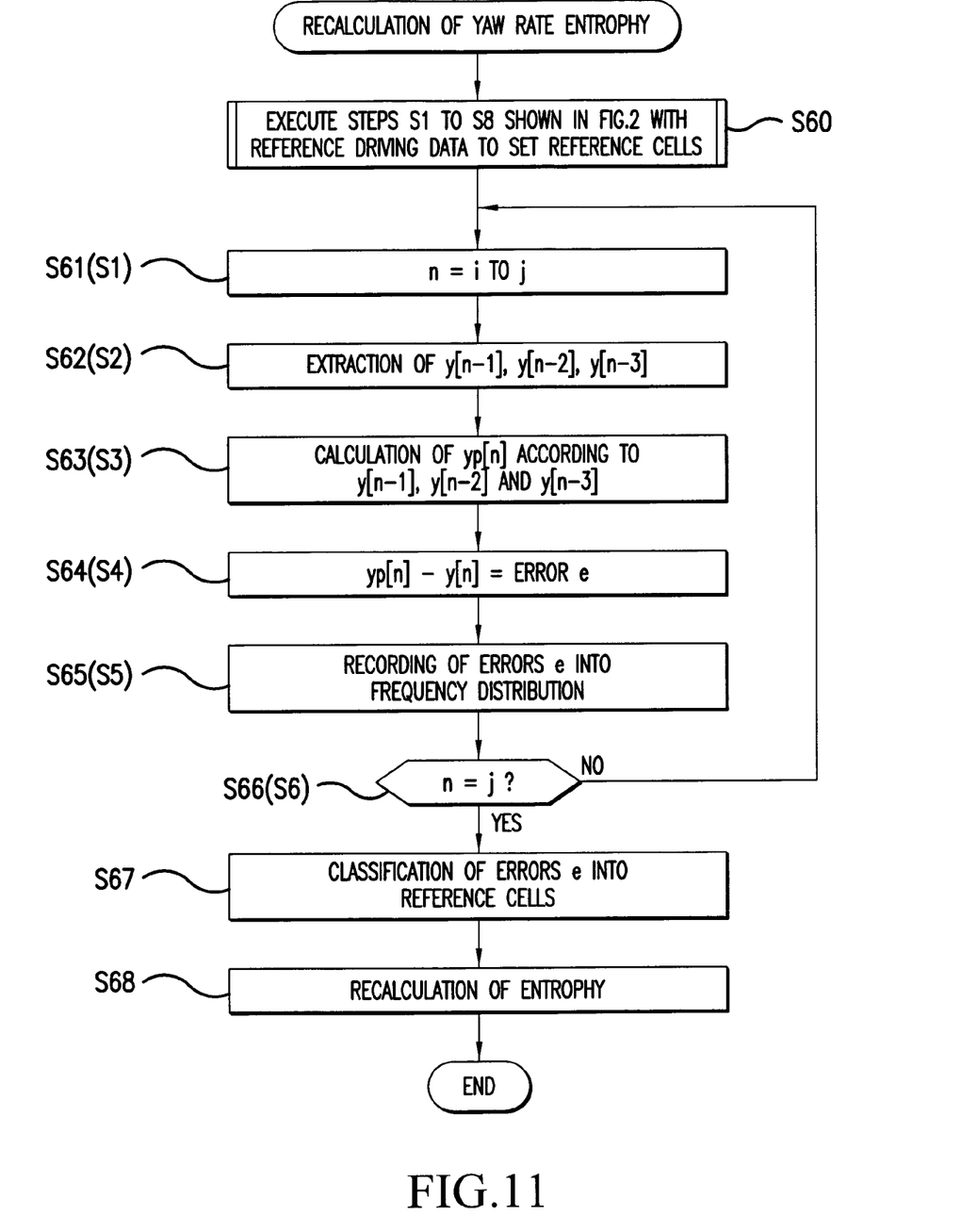
FIG. 11 is a flowchart showing the processing of recalculating a yaw rate entropy.

FIG. 11 is a flowchart showing the processing of recalculating the yaw rate entropy. In step S60, the reference driving data (e.g., the driving data identified by the identifier [c003] in this preferred embodiment) is used to execute the steps S1 to S8 in the yaw rate entropy calculation processing shown in FIG. 2 to thereby set nine cells as the reference cells, wherein the nine cells are specified in step S31, for example.

In steps S61 to S66, the other driving data (e.g., each of the other pieces of driving data identified by the identifiers [a001], [b001], and [a002] in this preferred embodiment) is used to execute the steps S1 to S6 in the yaw rate entropy calculation processing shown in FIG. 2, thereby recording the frequency distribution of the errors e.

In step S67, the errors e in each of the other pieces of driving data are classified into the nine reference cells set above. In step S68, the yaw rate entropy Hp in each of the other pieces of driving data is recalculated from Eq. (2) shown above.

Figure 9:
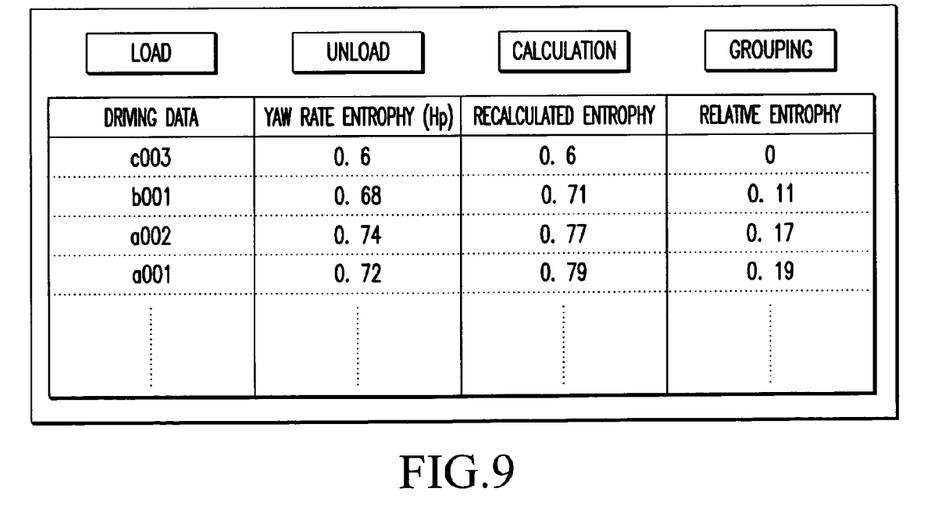
FIG. 9 is an illustration showing an example of the display of relative entropy.

Referring back to FIG. 5, step S40 is executed to obtain a difference between the result of recalculation of the yaw rate entropy and the yaw rate entropy corresponding to the reference driving data as the relative entropy. In step S41, the results of recalculation of the yaw rate entropy and the results of calculation of the relative entropy are sorted in ascending order and displayed in the form of a list as shown in FIG. 9.

In step S42, it is determined whether or not the calculation of an average in the relative entropy has been instructed. When the operator specifies a plurality of pieces of driving data on the screen shown in FIG. 9 and then clicks a "Grouping" button shown in FIG. 9, it is determined that the calculation of an average in the relative entropy has been instructed, and the program proceeds to step S43 to calculate an average of the values for the recalculated entropy corresponding to the above specified pieces of driving data and an average of the values for the relative entropy corresponding to the above specified pieces of driving data.

Figure 12:
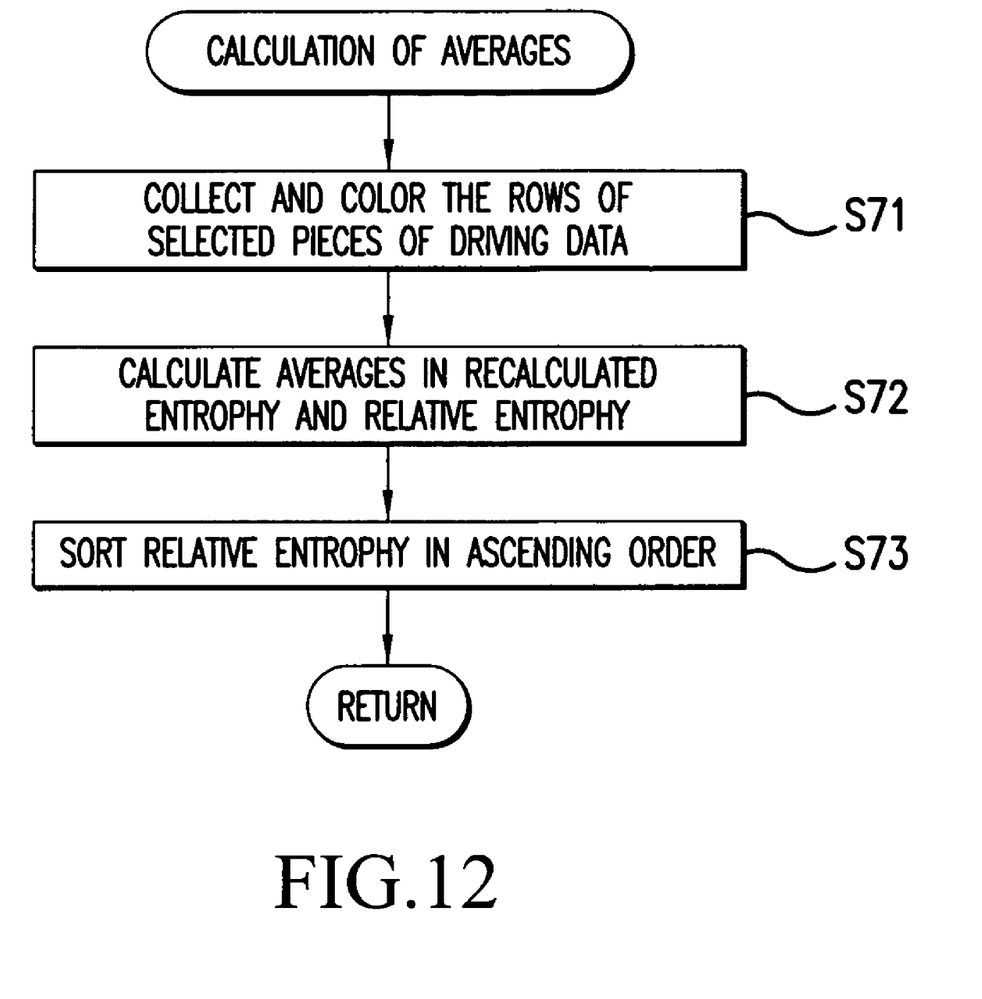
FIG. 12 is a flowchart showing the processing of calculating the averages in recalculated entropy and relative entropy.

FIG. 12 is a flowchart showing the processing of calculating the averages in the recalculated entropy and the relative entropy. In step S71, the rows of the selected pieces of driving data are collected and colored. In step S72, the average of the values for the recalculated entropy and the average of the values for the relative entropy corresponding to the selected pieces of driving data are calculated. In step S73, the results of calculation obtained in step S72 are sorted in ascending order in the columns of the relative entropy.

Figure 10:
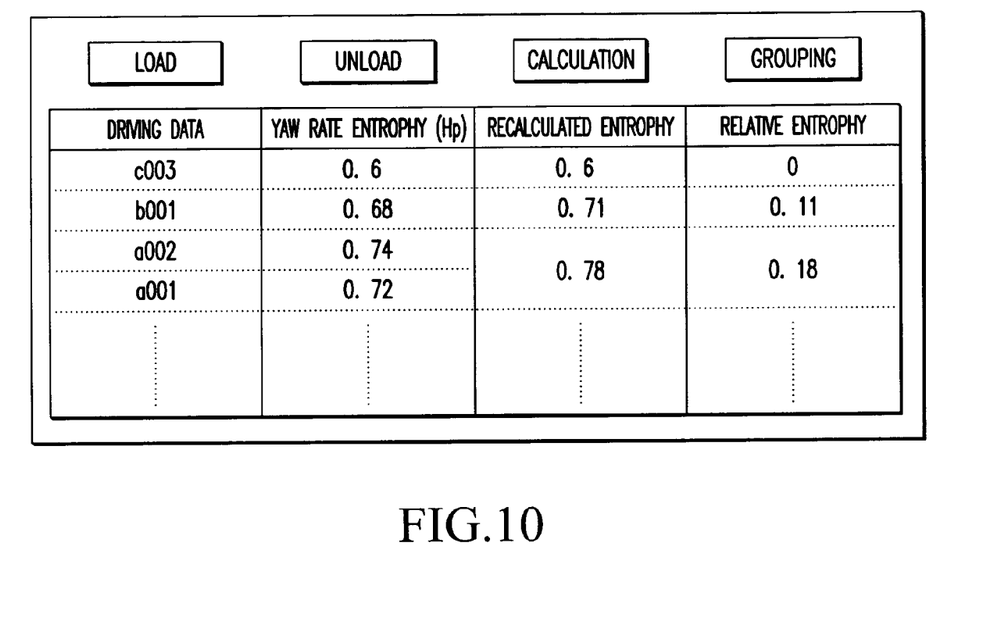
FIG. 10 is an illustration showing an example of the display of the averages in recalculated entropy and relative entropy.

Referring back to FIG. 5, step S44 is executed to display the averages calculated in step S43 in the form of a list as shown in FIG. 10 for illustration. In step S45, it is determined whether or not the ending of this program has been instructed. Until the ending of this program is instructed, the program returns to step S33 to repeat the subsequent steps.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driver load measuring device for measuring a load on a driver driving a vehicle accompanied by attitude changes, said driver load measuring device comprising:
   angular velocity detecting means for periodically detecting an angular velocity of said vehicle driven by said driver to which said load is applied;
   angular velocity predicting means for predicting a value for said angular velocity at an n-th timing from values for said angular velocity at the previous timings before said n-th timing, according to time-series data of said angular velocity detected above;
   means for obtaining an error between said predicted value and said detected value for said angular velocity at said n-th timing; and
   load calculating means for calculating said load according to a distribution of said errors in a predetermined time periods,
   wherein said load calculating means comprises:
      means for obtaining a percentile value α at a predetermined probability of said errors;
      means for setting a plurality of ranges (cells) discrete from said percentile value α at a predetermined rate, according to said percentile value α;
      means for classifying all of said errors into said plurality of cells; and
      means for obtaining an entropy of said angular velocity according to the results of classification of said errors;

said load on said driver being represented by said entropy of said angular velocity.

2. The driver load measuring device according to claim 1, wherein said vehicle comprises a motorcycle.

3. The driver load measuring device according to claim 1, wherein said load calculating means comprises:
   means for obtaining a percentile value α from first errors of an angular velocity detected by applying a first load to said driver and setting reference cells according to said percentile value α,
   means for classifying said first errors into said reference cells;
   means for calculating a first entropy of said angular velocity according to the results of classification of said first errors;
   means for classifying into said reference cells second errors of an angular velocity detected by applying a second load to said driver;
   means for recalculating a second entropy of said angular velocity according to the results of classification of said second errors; and
   means for calculating the relativity between said first entropy and said second entropy.

4. A driver load measuring method for measuring a load on a driver driving a vehicle accompanied by attitude changes, said driver load measuring method comprising the steps of:
   periodically detecting an angular velocity of said vehicle driven by said driver to which said load is applied;
   predicting a value for said angular velocity at an n-th timing from values for said angular velocity at the previous timings before said n-th timing, according to time-series data of said angular velocity detected above;
   obtaining an error between said predicted value and said detected value for said angular velocity at said n-th timing; and
   calculating said load according to a distribution of said errors in a predetermined time period,
   wherein said load calculating step comprises the steps of:
      obtaining a percentile value α at a predetermined probability of said errors;
      setting a plurality of ranges (cells) discrete from said percentile value α at a predetermined rate, according to said percentile value α,
      classifying all of said errors into said plurality of cells; and
      obtaining an entropy of said angular velocity according to the results of classification of said errors;
      said load on said driver being represented by said entropy of said angular velocity.

5. The driver load measuring method according to claim 4, wherein said vehicle comprises a motorcycle.

6. The driver load measuring method according to claim 4, wherein said load calculating step comprises the steps of:
   obtaining a percentile value α from first errors of an angular velocity detected by applying a first load to said driver and setting reference cells according to said percentile value α,
   classifying said first errors into said reference cells;
   calculating a first entropy of said angular velocity according to the results of classification of said first errors;
   classifying into said reference cells second errors of an angular velocity detected by applying a second load to said driver;
   calculating a second entropy of said angular velocity according to the results of classification of said second errors; and
   calculating the relativity between said first entropy and said second entropy.

7. The driver load measuring program for making a computer execute a driver load measuring method according to claim 6.

8. The driver load measuring program for making a computer execute a driver load measuring method according to claim 4.

9. The storage medium for storing a driver load measuring program according to claim 8 so that said program is readable by said computer.

10. A driver load measuring device for measuring a load on a driver driving a vehicle accompanied by attitude changes, said driver load measuring device comprising:
   angular velocity detecting means for periodically detecting an angular velocity of said vehicle driven by said driver to which said load is applied;
   angular velocity predicting means for predicting a value for said angular velocity at an n-th timing from values for said angular velocity at the previous timings before said n-th timing, according to time-series data of said angular velocity detected above;
   means for obtaining an error between said predicted value and said detected value for said angular velocity at said n-th timing; and
   load calculating means for calculating said load according to a distribution of said errors in a predetermined time period,
   wherein said load calculating means comprises:
      means for obtaining a percentile value α from first errors of an angular velocity detected by applying a first load to said driver and setting reference cells according to said percentile value α,
      means for classifying said first errors into said reference cells;
      means for calculating a first entropy of said angular velocity according to the results of classification of said first errors;
      means for classifying into said reference cells second errors of an angular velocity detected by applying a second load to said driver;
      means for recalculating a second entropy of said angular velocity according to the results of classification of said second errors; and
      means for calculating the relativity between said first entropy and said second entropy.

11. The driver load measuring device according to claim 10, wherein said vehicle comprises a motorcycle.

* * * * *